April 16, 1935.　　　E. ALTENKIRCH　　　1,997,668
ABSORPTION REFRIGERATING APPARATUS AND METHOD
Filed April 5, 1926
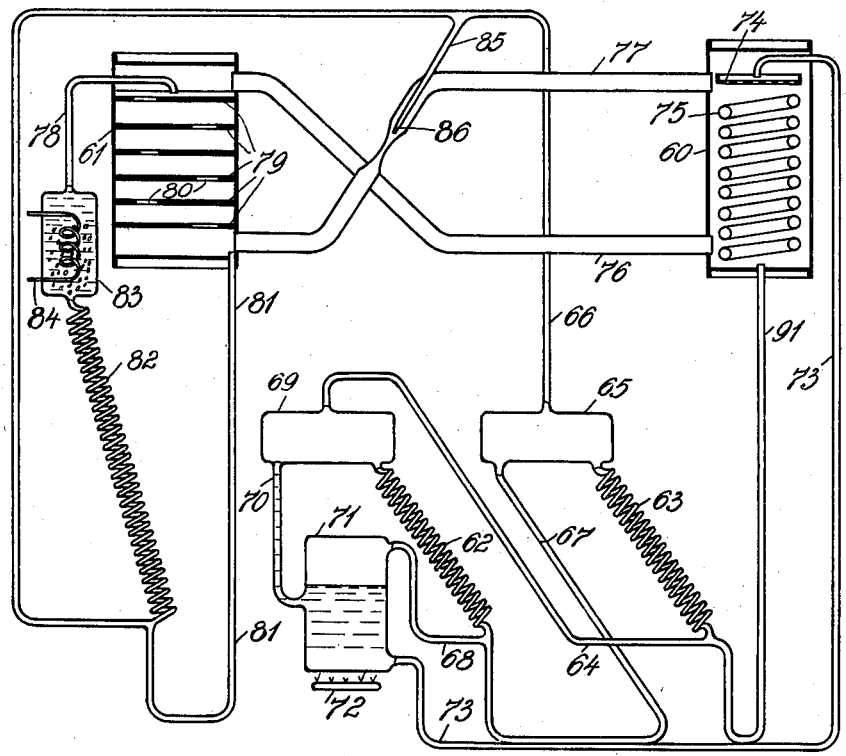
Inventor
Edmund Altenkirch
by Knight Bro. attorneys Patented Apr. 16, 1935

1,997,668

UNITED STATES PATENT OFFICE 1,997,668

ABSORPTION REFRIGERATING APPARATUS AND METHOD

Edmund Altenkirch, Alt-Landsberg Sud, Germany, assignor, by mesne assignments, to The Hoover Company, North Canton, Ohio, a corporation of Ohio Application April 5, 1926, Serial No. 99,890
In Germany April 8, 1925

20 Claims. (Cl. 62—119.5)

My invention relates to absorption refrigerating apparatus and method of operation thereof. One feature of my invention consists of a novel liquid circulation system. Other features and the complete nature and advantages of the invention will be apparent from the following description considered in conjunction with the accompanying drawing forming a part of this specification and illustrating diagrammatically one embodiment of my invention, although it will be appreciated that the invention is not limited to the specific embodiment disclosed.

Certain subject matter disclosed herein is claimed in my Reissue Patent No. 18,924 reissued Aug. 22, 1933, and in my Patent No. 1,955,697 granted April 17, 1934, and my Patent No. 1,976,593 granted Oct. 9, 1934.

Referring to the drawing in detail, an absorption refrigerating apparatus of the continuous type is shown as consisting of a number of vessels, as a boiler or generator 71, gas separation chambers 69 and 65, an absorber 60, an evaporator 61 and a resorber 83 together with various conduits and devices which go to make up the complete system.

Neutral gas flows through the absorber 60 and the expeller or evaporator 61. In the evaporator 61 the neutral gas is enriched by the gaseous working agent or refrigerant which is again absorbed by the absorption solution in the absorber 60. The working agent evaporates in the gas expeller 61 from a solution which is of a higher concentration than the solution in the absorber 60. By the expulsion of the gas in the expeller 61 heat is taken up from the surroundings through the walls of the gas expeller 61 to produce a cooling effect. In the absorber and in the gas expeller, the absorption solutions drop through the gases therein. In order to maintain the circulation of the absorption solutions, the solutions must be raised again. In order that the elevating pipes should not become too long and even increase the height of the machine, a plurality of elevating pipes may be provided side by side. In the embodiment illustrated, two elevating pipes 62 and 63 are employed. The strong solution descending from the absorber 60 reaches the lower end of the elevating pipe 63 through the pipe 91 where the gaseous working agent is supplied to it through the pipe 64. The mixture of gas and liquid ascends through the elevating pipe 63 into the gas separator 65. The gas is conveyed away by the pipe 66 while the liquid descends in the pipe 67 and reaches the lower end of the elevating pipe 62. Here it is supplied with the gaseous working agent through the pipe 68. Gas and liquid pass through the elevating pipe 62 into the gas separator 69 from which the gas escapes through the pipe 64 while the liquid flows through the pipe 70 into the gas expeller or boiler 71. The boiler is heated by any suitable heating device such as the burner 72. The expelled gas is led away from the boiler by the pipe 68 and the weak absorption solution returns to the upper part of the absorber 60 through the pipe 73. The liquid flowing through the pipe 67 passes in heat exchange with the liquid in the pipe 73 so that the hot solution coming from the boiler gives off part of its heat to the solution flowing into the boiler. The gas driven off in the boiler 71 raises the solution, already slightly heated, in the pipe 62.

Owing to the high concentration of the solution in the coil 62, a part of the solvent contained in the vapors generated in the boiler is rectified. At the same time some refrigerant is expelled from the solution. The coil 62 thus acts as an analyzer as well as a gas lift pump. The same is true of the coil 63 in which the gases coming from the separator 69 mix with the liquid coming from the absorber, which is of a still higher concentration. With the object of increasing the circulation, one of the elevating pipes 62 and 63 or even both may be heated for which purpose waste heat of low temperature is preferably employed. The solution from which the gas has been expelled flows into the upper part of the absorber 60 and is there caught by the dish 74 and distributed. It drips down over the coil 75 through which cooling liquid flows. The absorption liquid in the absorber 60 absorbs the gaseous working medium or agent which enters the absorber at the bottom with a neutral gas. The weak neutral gas leaves the absorber through the pipe 77 and enters the gas expeller or evaporator 61 at the bottom. It leaves the evaporator at the top through the pipe 76. In the expeller 61 a plurality of partition walls 79 are provided. These are preferably porous so that they may absorb and become saturated with absorption liquid. These horizontal partitions are provided with opening 80 which are arranged in staggered relation. The stream of gas entering through the pipe 77 is obliged to pass through these openings so that it is brought into intimate contact with the absorption solution. This strong or resorber solution is introduced into the evaporator by the pipe 78 at the upper end. It drips down over the plates 79 and flows through the pipe 81 to the lower end of the gas lift pump pipe 82. Refrigerant gas is passed into the pipe 82 through the pipe 66 connected to the separator 65. Gas and liquid ascend through the elevating pipe 82 into the resorber 83 which is cooled by the coil 84. In the resorber, the gas is changed to a more dense fluid phase by being absorbed by the liquid. In its enriched state the solution then passes into the gas expeller through the pipe 78. A portion of the gas flowing through the pipe 66 branches off into the pipe 85 which opens into the nozzle 86. The gas issuing from the nozzle 86 causes the motion of the inert or neutral gas in the pipes 76 and 77.

The gas expelled in the boiler 71 is utilized to raise the absorption solution at three different places viz. in the three elevating or gas lift pump pipes 62, 63 and 82.

In accordance with known engineering practices the apparatus may be charged with ammonia as refrigerant, water as absorption liquid and air or hydrogen or a mixture of the two or other inert gases as the pressure equalizing medium.

I claim as my invention:—

1. Refrigerating apparatus including a plurality of coils arranged at the same level and arranged to permit flow of fluid upwardly therein, means connecting the coils in series, means for introducing gaseous fluid into one of the coils to produce thermosiphon circulation and means including a generator for completing a cycle for flow of liquid through the coils and the generator, the flow being upwardly in the coil into which gaseous fluid is introduced, thence upwardly through another of said coils, thence downwardly through the generator, and thence back to the coil into which the gaseous fluid is introduced.

2. Refrigerating apparatus including a generator, an evaporator, a plurality of coils, conduits connecting the generator and the coils for flow of absorption liquid, means to introduce gaseous fluid into the lower end of one of the coils and means to by-pass fluid around the generator from the upper end of said coil to the evaporator.

3. Refrigerating apparatus including an evaporator wherein one fluid diffuses into another, a generator, an upwardly extending conduit and means forming a circulation circuit between the generator and the upwardly extending conduit for circulation of absorption liquid, said means comprising a heat exchanger and means to introduce gaseous fluid into the upwardly extending conduit, the arrangement being such that absorption liquid is lifted in the upwardly extending conduit and thence conveyed to the heat exchanger.

4. Refrigerating apparatus of the absorption type including a generator, a plurality of vertically extending conduits connected for series flow of fluid therethrough, and means for circulating liquid between and through said generator and said conduits including means for causing lifting of liquid by vaporous fluid in said conduits.

5. Refrigerating apparatus of the absorption type including a generator, a plurality of vertically extending coils arranged at about the same elevation, and means for circulating liquid between and through said generator and said coils including means for causing lifting of liquid by vaporous fluid in said coils.

6. Refrigerating apparatus of the absorption type including a generator, a plurality of vertically extending conduits connected for series flow of fluid therethrough, and means for circulating liquid between and through said generator and said conduits including means for introducing vaporous fluid into the lower end of one of said conduits and means for causing lifting of liquid by vaporous fluid in another of said conduits.

7. Refrigerating apparatus of the absorption type including a generator, a plurality of vertically extending conduits connected for series flow of fluid therethrough, and means for circulating liquid between and through said generator and said conduits including means for introducing vaporous fluid into the lower end of one of said conduits and means for heating the other of said conduits for generating vaporous fluid therein.

8. In a continuous absorption refrigerating system, a boiler, an absorber, a gas separation chamber, a conduit for conveying absorption liquid from the boiler to the absorber, a conduit for conveying absorption liquid from the absorber to the gas separation chamber, a conduit for conveying absorption liquid from the gas separation chamber to the boiler and means for conveying refrigerant gas from the boiler to the conduit conveying absorption liquid to the gas separation chamber to facilitate the flow of absorption liquid through said conduits.

9. In a continuous absorption refrigerating system, a boiler, an absorber, a gas separation chamber, a conduit for conveying absorption liquid from the boiler to the absorber, a conduit for conveying absorption liquid from the absorber to the gas separation chamber, a conduit for conveying absorption liquid from the gas separation chamber to the boiler and means for conveying refrigerant gas from the boiler to the conduit conveying absorption liquid to the gas separation chamber to facilitate the flow of absorption liquid through said conduits, said last mentioned means including a coil adapted to bring the gas and liquid into intimate contact.

10. In a continuous absorption refrigerating system, a boiler, an absorber, means for conveying absorption liquid from the boiler to the absorber, means for conveying absorption liquid from the absorber to the boiler and including a coil of pipe located below the absorber, and means for conveying refrigerant gas from the boiler to said coil and causing it to pass upwardly therethrough.

11. In a continuous absorption refrigerating system, a boiler, an absorber, means for conveying absorption liquid from the boiler to the absorber, means for conveying absorption liquid from the absorber to the boiler and including a coil of pipe located below the absorber, and means for conveying refrigerant gas from the boiler to said coil and causing it to pass upwardly therethrough, the arrangement being such that the passage of gas upwardly through said coil promotes circulation of absorption liquid between the boiler and the absorber.

12. In a refrigerating system, the combination with a generator, a device for changing gaseous refrigerant to a more dense fluid phase, an evaporator, an absorber and conduits interconnecting the same, of a plurality of thermo-siphon lift members in which liquid is lifted by the action of gas, means to convey liquid upwardly through said members in series, and means to supply gas to the lower parts of said members.

13. In a refrigerating system, a generator, an absorber, and means for circulating liquid between said generator and said absorber comprising a plurality of thermo-siphon lift members in which liquid is lifted by the action of gas, means to conduct liquid serially through said members in a given order, and means to conduct gas serially through said members in reverse order.

14. In a refrigerating system, a generator, an evaporator, an absorber, means to circulate an inert gas and a refrigerant through the evaporator, and means for circulating refrigerant and absorption liquid between said generator and said absorber comprising a plurality of thermo-siphon lift members in which liquid is lifted by the action of gas, means to conduct liquid serially through said members in a given order, and means to conduct gas serially through said members in reverse order.

15. In a refrigerating system, a generator, an absorber, and means for circulating liquid between said generator and said absorber comprising a plurality of thermo-siphon lift members in which liquid is lifted by action of gas and means to conduct liquid serially through said members in a given order, to conduct gas serially through said members in reverse order, and liquid and gas within the members in the same direction.

16. The combination in a refrigerating system with an evaporator, an absorber, and means to circulate a refrigerant and an inert gas through the evaporator and absorber, of a generator, a first gas separator, a second gas separator, a first thermo-siphon lift member connected to said first gas separator, a second thermo-siphon lift member connected to said second gas separator, means to conduct gas from said first gas separator and liquid from said absorber to the bottom of said second thermo-siphon member, means to conduct liquid from said second gas separator to the bottom of said first thermo-siphon member, and conduits completing a circulation circuit between the generator and absorber.

17. In a refrigerating system, a generator, an absorber, a vessel situated above said generator, a conduit connecting the bottom of the absorber with said vessel, a conduit connecting the vapor space of the generator with a point in the first-mentioned conduit below the normal level of liquid in the generator, and a conduit connecting said vessel with the generator.

18. Refrigerating apparatus including a generator, a device for changing gaseous refrigerant to a more dense fluid phase, an evaporator, an absorber, a vessel situated above the generator, the aforementioned parts being interconnected to form a system wherein a refrigerant, an absorption liquid and an inert gas are circulated, said system including a conduit connecting the bottom of the absorber with said vessel, a conduit connecting the vapor space of the generator with a point in said conduit below the normal level of liquid in the generator, and a conduit connecting said vessel with the generator.

19. In the art of refrigeration with an absorption system, the improvement which consists in expelling refrigerant from a body of solution, conducting all the expelled vapor out of the presence of the body of solution from which it is expelled and through a second body of solution in an upwardly extending path, separating the vapor from the second mentioned body of solution after passage through said path, and conducting the second mentioned body of solution to the first mentioned body of solution.

20. In the art of refrigeration with an absorption system, the improvement which consists in expelling refrigerant from a body of solution, conducting all the expelled vapor out of the presence of the body of solution from which it is expelled and through a second body of solution in an upwardly extending path, separating the vapor from the second mentioned body of solution after passage through said path, conducting the second mentioned body of solution to the first mentioned body of solution, and producing continuous circulation of solution due to flow in said path.

EDMUND ALTENKIRCH.